US011623584B2

(12) United States Patent
Seki

(10) Patent No.: US 11,623,584 B2
(45) Date of Patent: Apr. 11, 2023

(54) SHOVEL

(71) Applicant: SUMITOMO(S.H.I.) CONSTRUCTION MACHINERY CO., LTD., Tokyo (JP)

(72) Inventor: Takuma Seki, Chiba (JP)

(73) Assignee: SUMITOMO(S.H.I.) CONSTRUCTION MACHINERY CO., LTD., Tokyo (JP)

( * ) Notice: Subject to any disclaimer, the term of this patent is extended or adjusted under 35 U.S.C. 154(b) by 924 days.

(21) Appl. No.: 16/527,551

(22) Filed: Jul. 31, 2019

(65) Prior Publication Data

US 2019/0352882 A1     Nov. 21, 2019

Related U.S. Application Data

(63) Continuation of application No. PCT/JP2018/005269, filed on Feb. 15, 2018.

(30) Foreign Application Priority Data

Feb. 21, 2017    (JP) .............................. JP2017-030426

(51) Int. Cl.
| | |
|---|---|
| *B60R 11/04* | (2006.01) |
| *E02F 9/08* | (2006.01) |
| *E02F 3/36* | (2006.01) |
| *E02F 9/00* | (2006.01) |
| *E02F 9/26* | (2006.01) |

(52) U.S. Cl.
CPC ................ *B60R 11/04* (2013.01); *E02F 3/36* (2013.01); *E02F 9/00* (2013.01); *E02F 9/0858* (2013.01); *E02F 9/0891* (2013.01); *E02F 9/261* (2013.01)

(58) Field of Classification Search
CPC ......... B60R 11/04; B62D 25/10; B62D 25/24; E02F 3/30; E02F 3/36; E02F 9/00; E02F 9/08; E02F 9/0858; E02F 9/0891; E02F 9/261
USPC ...................... 180/69.21; 296/190.08, 193.11
See application file for complete search history.

(56) References Cited

U.S. PATENT DOCUMENTS

| | | | | |
|---|---|---|---|---|
| 10,186,017 | B2* | 1/2019 | Imano | .................... H04N 5/247 |
| 10,497,184 | B2* | 12/2019 | Izumikawa | ............. E02F 9/261 |
| 2003/0085995 | A1 | 5/2003 | Sawada et al. | |
| 2010/0073479 | A1 | 3/2010 | Uto et al. | |

(Continued)

FOREIGN PATENT DOCUMENTS

| | | | |
|---|---|---|---|
| CN | 1873117 A | * | 12/2006 |
| CN | 104846865 | | 8/2015 |

(Continued)

OTHER PUBLICATIONS

English translation of JP H10-140619; retrieved via PatentTranslate located at www.epo.org. (Year: 2022).*

(Continued)

*Primary Examiner* — Jason S Daniels
(74) *Attorney, Agent, or Firm* — IPUSA, PLLC

(57) ABSTRACT

A shovel includes a lower traveling body, an upper turning body turnably mounted on the lower traveling body, a covering attached on the upper turning body, and a camera for surroundings monitoring placed on the upper turning body. A cut is formed in the covering. The camera is placed on the upper turning body such that at least part of the camera is within the covering through the cut.

14 Claims, 17 Drawing Sheets

(56) References Cited

U.S. PATENT DOCUMENTS

| | | |
|---|---|---|
| 2013/0222594 A1 | 8/2013 | Kiyota |
| 2013/0259624 A1 | 10/2013 | Manabe |
| 2014/0085467 A1 | 3/2014 | Barthel |
| 2016/0114837 A1* | 4/2016 | Iwahashi ............ E02F 9/16 296/190.08 |
| 2016/0125666 A1 | 5/2016 | Izumikawa et al. |

FOREIGN PATENT DOCUMENTS

| | | |
|---|---|---|
| JP | H10-140619 | 5/1998 |
| JP | 2002201676 A * | 7/2002 |
| JP | 2002-371595 | 12/2002 |
| JP | 2005-256794 | 9/2005 |
| JP | 2008-184789 | 8/2008 |
| JP | 2009-167747 | 7/2009 |
| JP | 2011-241643 | 12/2011 |
| JP | 2012-109741 | 6/2012 |
| JP | 2013-189778 | 9/2013 |
| JP | 2013-204288 | 10/2013 |
| JP | 2014-047463 | 3/2014 |
| JP | 2015-021258 | 2/2015 |
| JP | 2015-175227 | 10/2015 |
| JP | 2016-217232 | 12/2016 |
| KR | 10-2006-0063666 | 6/2006 |
| WO | 2012/073872 | 6/2012 |
| WO | WO-2014148204 A1 * | 9/2014 ............ E02F 9/24 |

OTHER PUBLICATIONS

English translation of CN 104846865; retrieved via PatentTranslate located at www.epo.org. (Year: 2022).*

International Search Report for PCT/JP2018/005269 dated May 15, 2018.

* cited by examiner

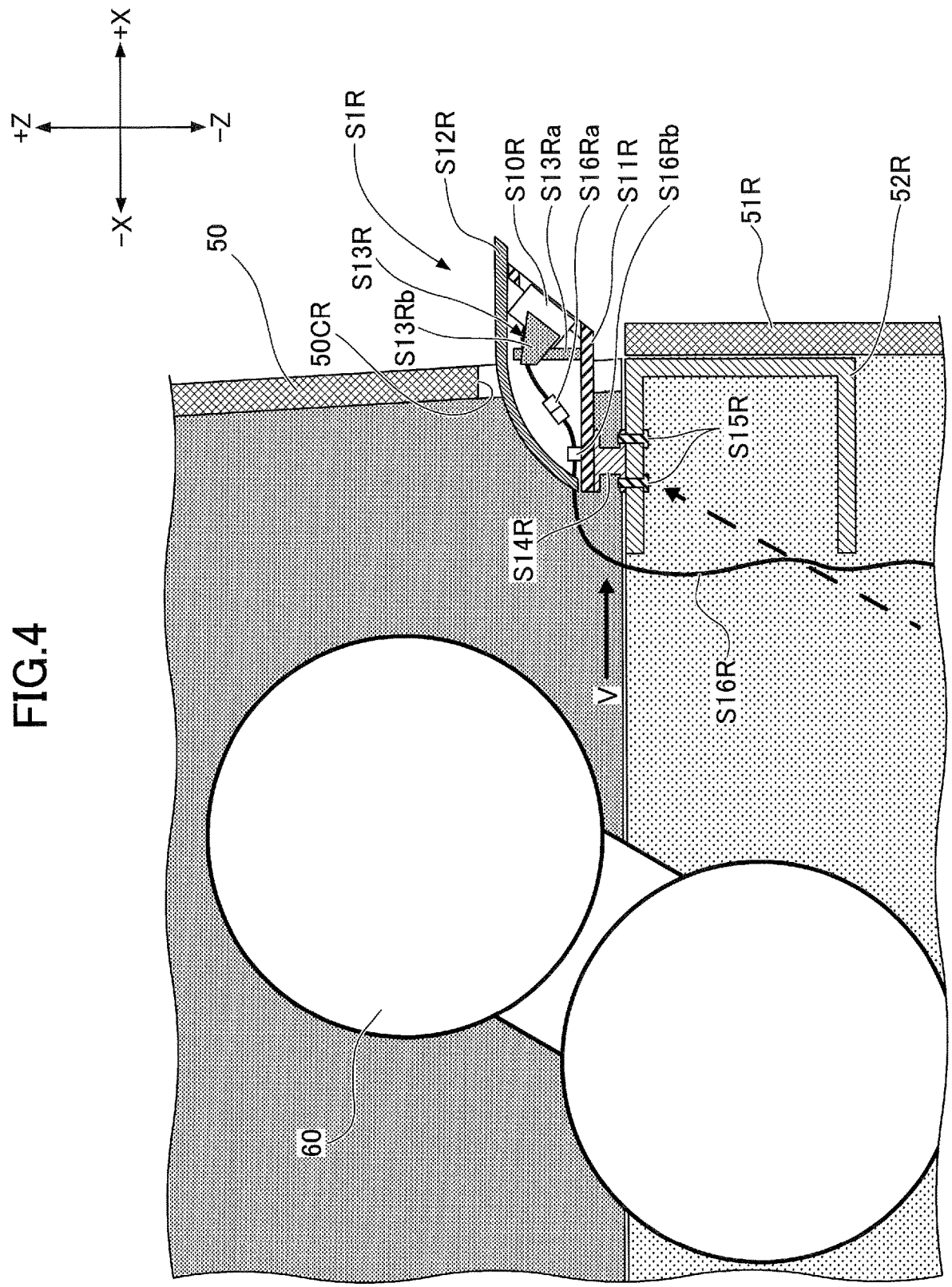

SHOVEL

CROSS-REFERENCE TO RELATED APPLICATIONS

This application is a continuation application filed under 35 U.S.C. 111(a) claiming benefit under 35 U.S.C. 120 and 365(c) of PCT International Application No. PCT/JP2018/005269, filed on Feb. 15, 2018 and designating the U.S., which claims priority to Japanese patent application No. 2017-030426, filed on Feb. 21, 2017. The entire contents of the foregoing applications are incorporated herein by reference.

BACKGROUND

Technical Field

The present invention relates to shovels with a surroundings monitoring camera.

Description of Related Art

A shovel with multiple surroundings monitoring cameras is known.

SUMMARY

According to an aspect of the present invention, a shovel includes a lower traveling body, an upper turning body turnably mounted on the lower traveling body, a covering attached on the upper turning body, and a camera for surroundings monitoring placed on the upper turning body. A cut is formed in the covering. The camera is placed on the upper turning body such that at least part of the camera is within the covering through the cut.

BRIEF DESCRIPTION OF THE DRAWINGS

FIG. 4 is a sectional view of a right camera and its vicinity;

DETAILED DESCRIPTION

According to a shovel with multiple surroundings monitoring cameras, the cameras are attached one to each end of the upper surface of the upper turning body in the vehicle width direction outside the engine hood. When the size of the engine hood increases outward in the vehicle width direction because of installation of an exhaust gas treatment apparatus, however, a portion of the upper surface of the upper turning body outside the engine hood in the vehicle width direction narrows. Therefore, it may be impossible to secure a space for placing the cameras.

In view of the above, it is desired to provide a shovel that allows a camera to be placed at a desired position even when the upper turning body cannot provide a sufficient space for placing cameras.

According to an aspect of the present invention, it is possible to provide a shovel that allows a camera to be placed at a desired position even when the upper turning body cannot provide a sufficient space for placing cameras.

Figure 1:
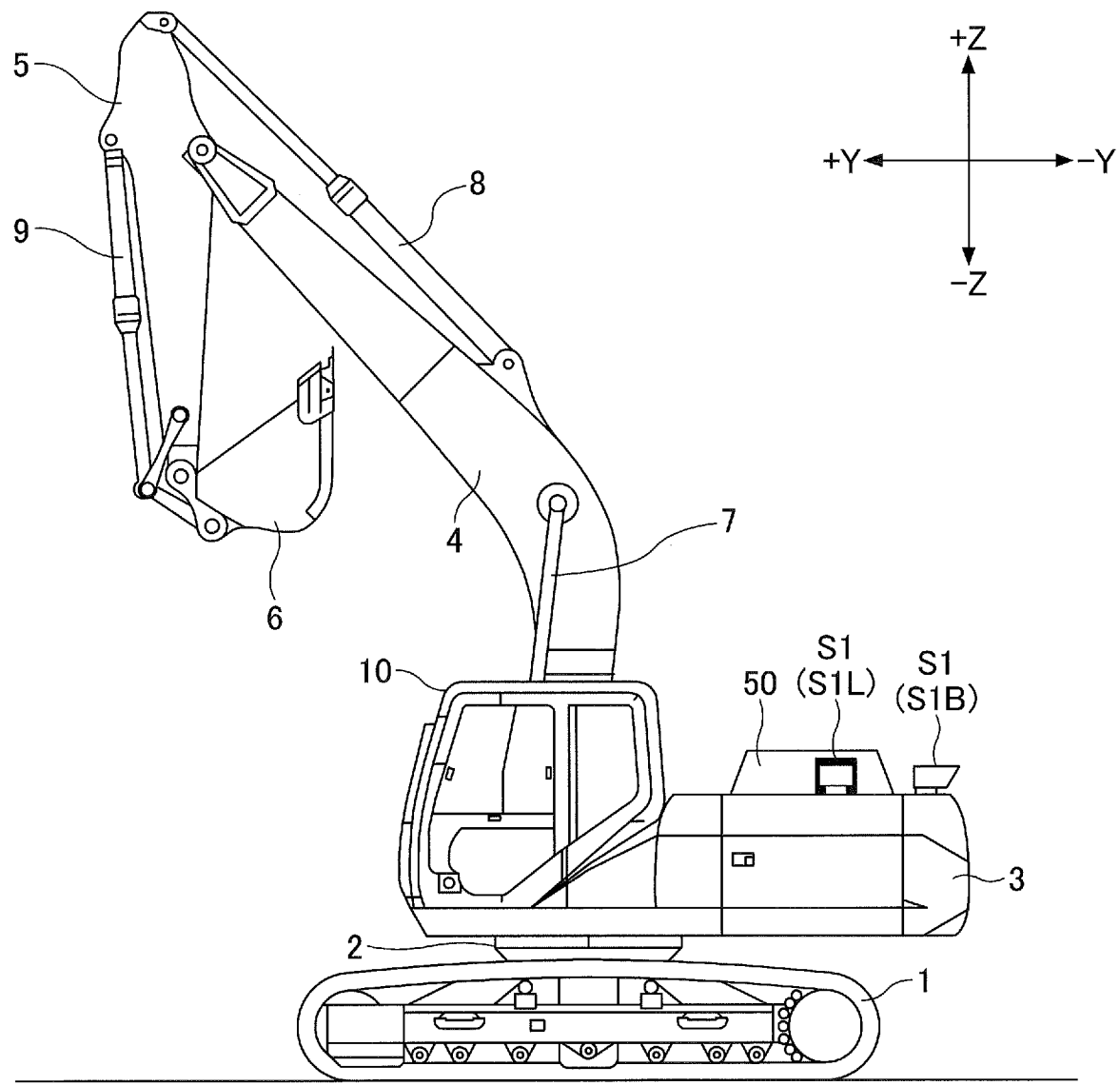
FIG. 1 is a side view of a shovel according to an embodiment of the present invention.

FIG. 1 is a side view of a shovel (excavator) according to an embodiment of the present invention. An upper turning body 3 is turnably mounted on a lower traveling body 1 of the shovel via a turning mechanism 2. A boom 4 is attached to the upper turning body 3. An arm 5 is attached to the end of the boom 4, and a bucket 6 serving as an end attachment is attached to the end of the arm 5. The boom 4, the arm 5, and the bucket 6 constitute an excavation attachment that is an example of an attachment, and are hydraulically driven by a boom cylinder 7, an arm cylinder 8, and a bucket cylinder 9, respectively. A cabin 10 is provided and power sources such as an engine are mounted on the upper turning body 3.

An engine hood 50 serving as a covering is attached and a surroundings monitoring camera S1 is placed on the upper surface of the upper turning body 3. The camera S1 is a device that captures images of the surroundings of the shovel. According to this embodiment, the camera S1 includes a left camera S1L, a right camera S1R, and a back camera S1B.

Figure 2:
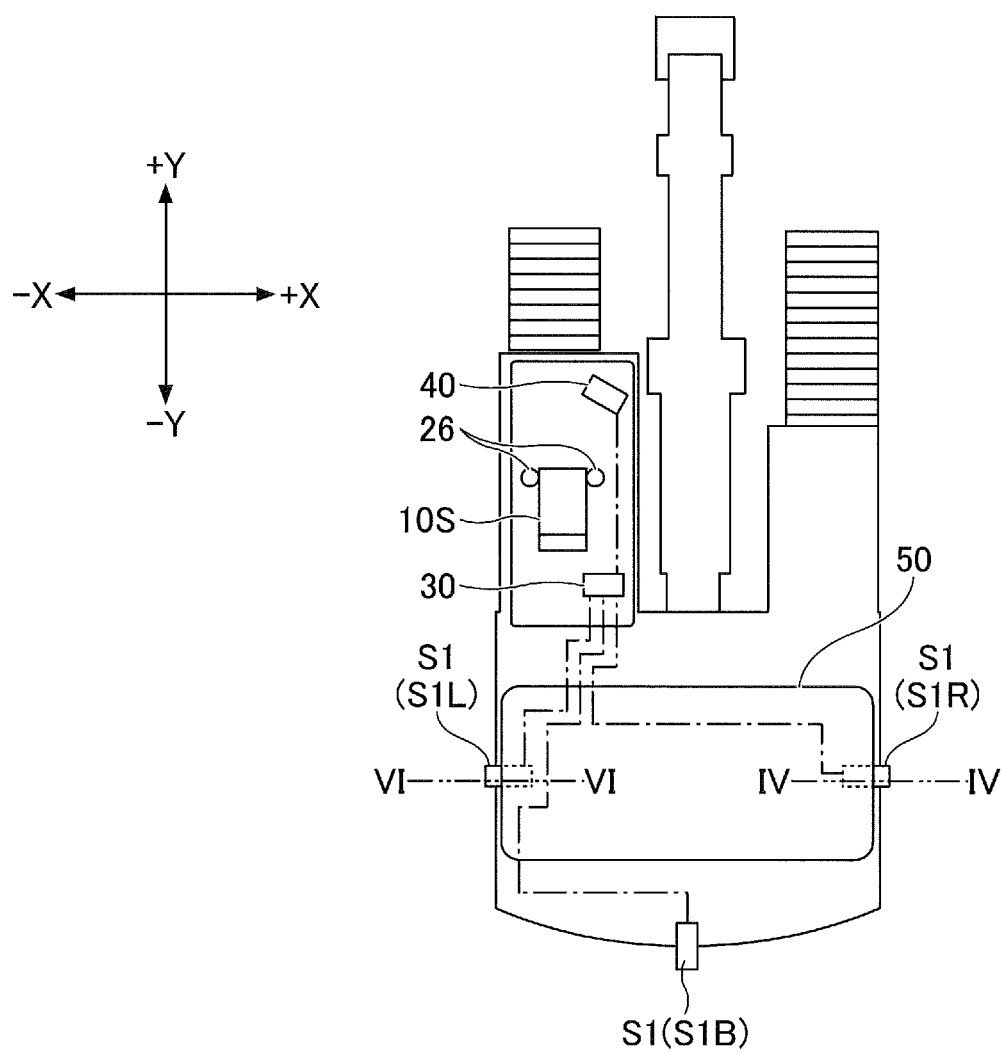
FIG. 2 is a plan view of the shovel of FIG. 1.
Figure 3A:
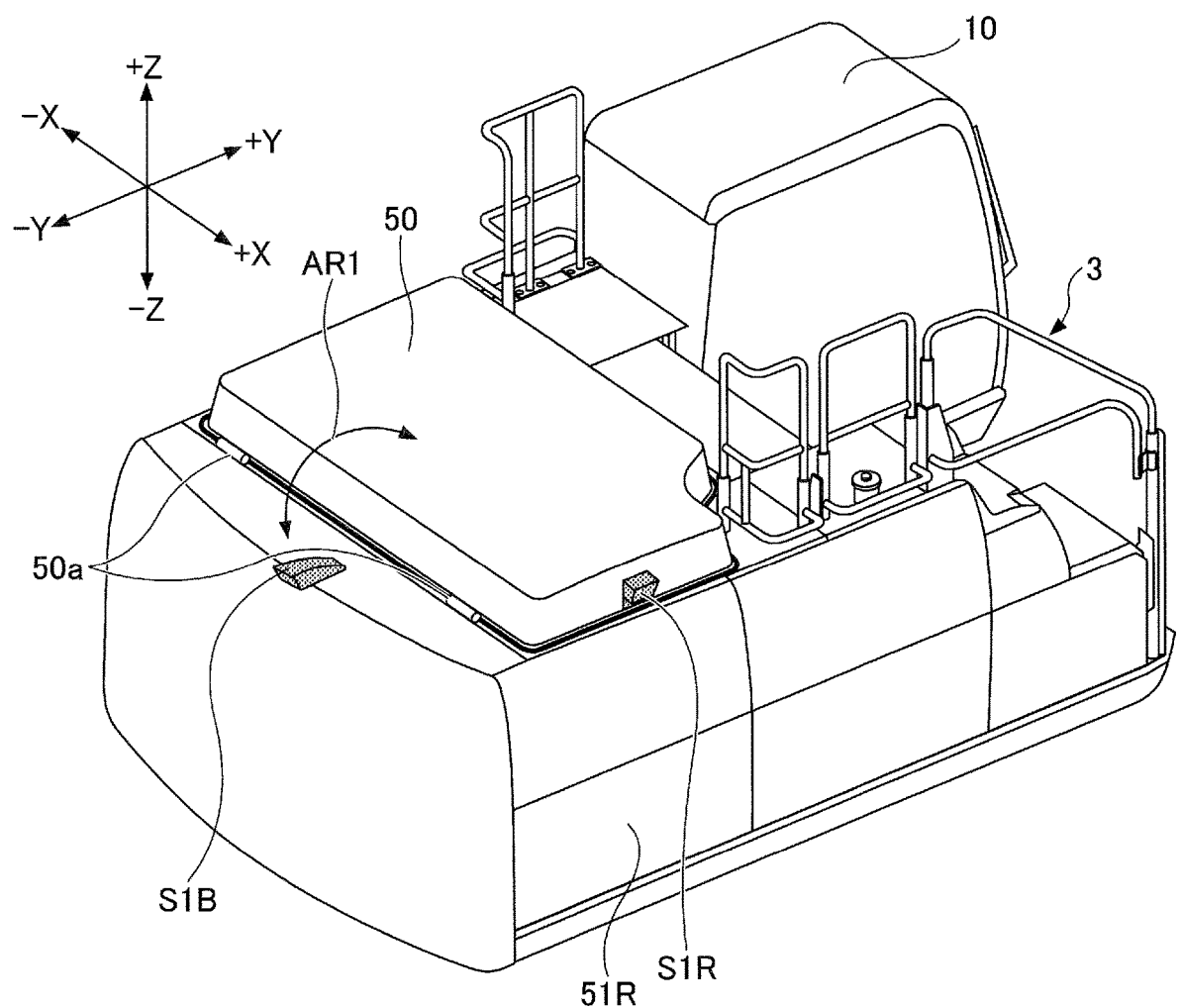
FIG. 3A is a rear perspective view of an upper turning body.
Figure 3B:
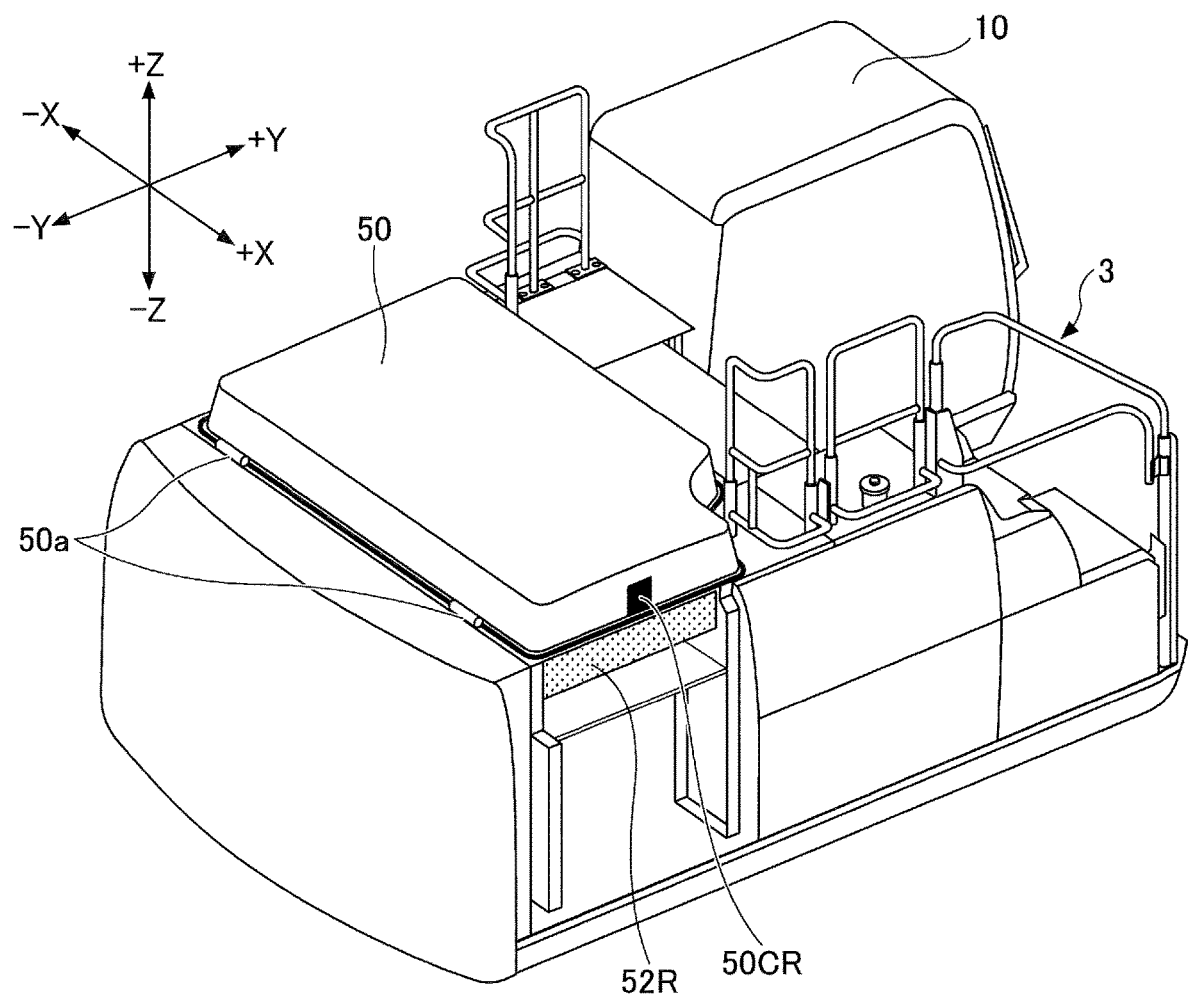
FIG. 3B is a rear perspective view of the upper turning body.

Here, an example arrangement of the camera S1 is described with reference to FIGS. 2, 3A and 3B. FIG. 2 is a plan view of the shovel of FIG. 1. FIGS. 3A and 3B are rear perspective views of the upper turning body 3. FIG. 3A illustrates that the right camera S1R is placed on the upper surface of the upper turning body 3. FIG. 3B illustrates that the right camera S1R and a right side door 51R are removed. The right side door 51R is a door that can be opened and closed and can be locked. According to this embodiment, the right side door 51R is a hinged door, but may alternatively be a sliding door.

As illustrated in FIG. 2, an operator seat 10S, operating levers 26, a controller 30, a display device 40, etc., are placed in the cabin 10.

The operating levers 26 are devices that an operator uses to operate the shovel. According to this embodiment, the operating levers 26 are used to turn the upper turning body 3, move up and down the boom 4, open and close the arm 5, and open and close the bucket 6.

The controller 30 operates as a main control part configured to control the driving of the shovel. According to this embodiment, the controller 30 is composed of a computer including a CPU, a RAM, a ROM, etc. For example, the CPU executes a program stored in the ROM to implement various functions of the controller 30, such as an image processing function. The controller 30 operates as, for example, an image processor. In this case, the controller 30 generates a composite image such as an overhead view image that is a virtual viewpoint image of the shovel as viewed from a virtual viewpoint right above the shovel, based on images captured by the left camera S1L, the right camera S1R, and the back camera S1B.

The display device 40 displays various kinds of information. According to this embodiment, the display device 40, for example, displays a composite image generated by the controller 30 such that the composite image can be switched. Specifically, an image captured by the left camera S1L, an image captured by the right camera S1R, an image captured by the back camera S1B, and the composite image are displayed in a switchable manner.

As illustrated in FIG. 2, the left camera S1L is placed at the left end (the −X side end) of the upper surface of the upper turning body 3, the right camera S1R is placed at the right end (the +X side end) of the upper surface of the upper turning body 3, and the back camera S1B is placed at the rear end (−Y side end) of the upper surface of the upper turning body 3 (counterweight). Each of the left camera S1L, the right camera S1R, and the back camera S1B is connected to the controller 30 via a cable indicated by a one-dot chain line.

The dashed line of FIG. 2 is a hidden line indicating that each of the left camera S1L and the right camera S1R is placed in such a manner as to be partly within the engine hood 50. Each of the left camera S1L and the right camera S1R may also be placed in such a manner as to be entirely or substantially entirely within the engine hood 50.

Specifically, as illustrated in FIGS. 3A and 3B, the right camera S1R is placed on the upper surface of the upper turning body 3 in such a manner as to be partly within the engine hood 50 through a right cut 50CR formed in a lateral side of the engine hood 50. More specifically, the right camera S1R is removably attached to a right house frame 52R that is exposed by opening the right side door 51R.

Likewise, although invisible in FIGS. 3A and 3B, the left camera S1L is placed on the upper surface of the upper turning body 3 in such a manner as to be partly within the engine hood 50 through a left cut 50CL (invisible) formed in a lateral side of the engine hood 50. More specifically, the left camera S1L is removably attached to a left house frame 52L (invisible) that is exposed by opening a left side door 51L (invisible).

According to this embodiment, as indicated by the arrow AR1, the engine hood 50 is configured to be openable and closable on hinges 50a serving as a rotating shaft. The engine hood 50 is opened to expose the entirety of the right camera S1R remaining on (attached to) the right house frame 52R. The same is the case with the left camera S1L. The engine hood 50, however, may alternatively be configured to be removable and not openable or closable.

Figure 5:
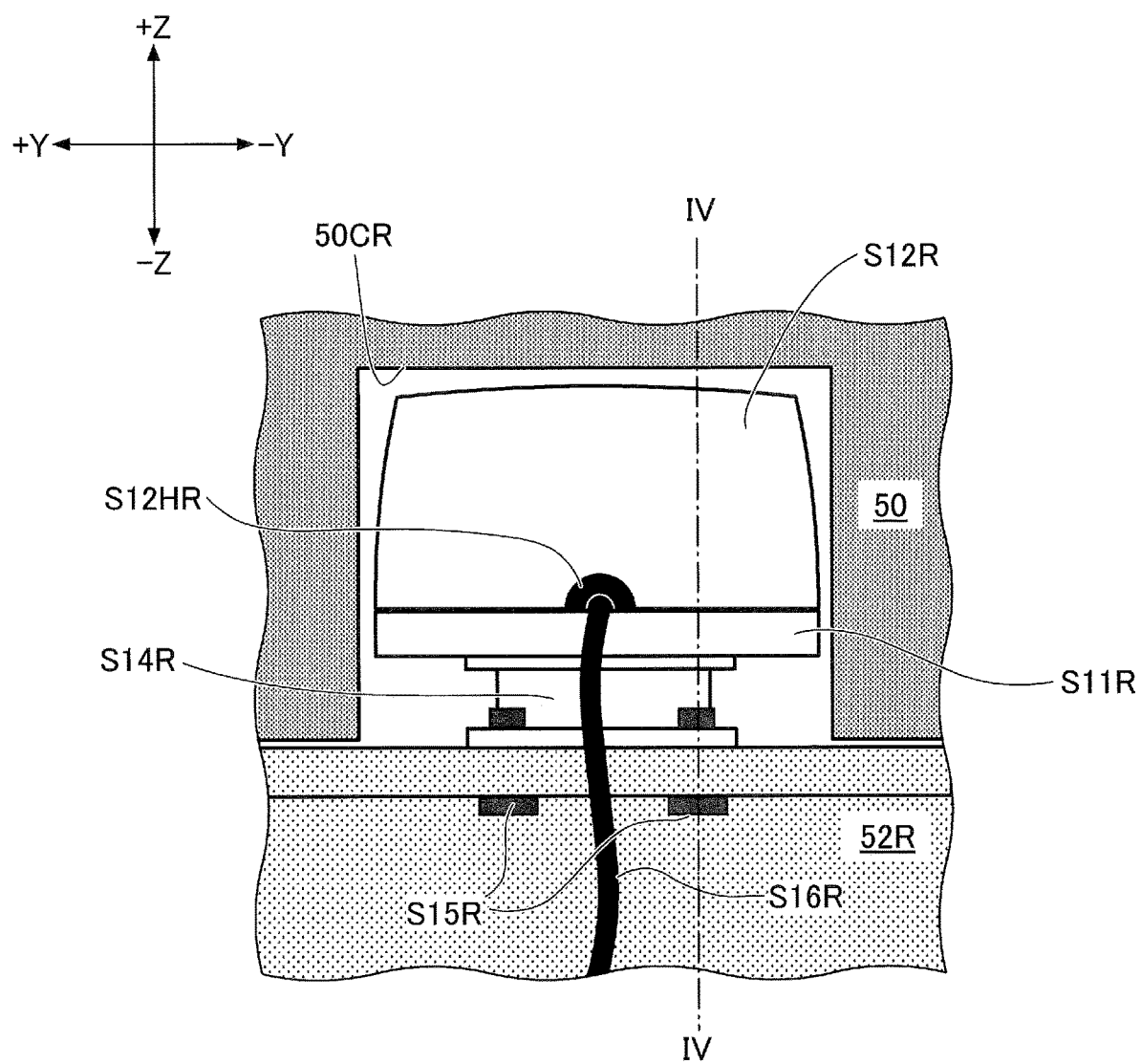
FIG. 5 is a rear view of the right camera.

Next, the right camera S1R is described in detail with reference to FIGS. 4 and 5. FIG. 4 illustrates a cross section in a virtual vertical plane indicated by the line IV-IV shown in each of FIGS. 2 and 5. FIG. 5 is a rear view of the right camera S1R as viewed from the direction indicated by the arrow V in FIG. 4.

The right camera S1R basically includes an imaging part S10R, a base part S11R, a cover S12R, a mounting part S13R, a bracket part S14R, a fastening member S15R, and a harness S16R.

The imaging part S10R is a part including an imaging device such as a CCD, a CMOS or the like, an optical system such as a lens, a printed board, etc.

The base part S11R is a constituent member of a lower portion of the housing of the right camera S1R. According to this embodiment, the base part S11R is formed of a metal plate for high stiffness, but may alternatively be formed of another material such as resin.

The cover S12R is a constituent member of an upper portion of the housing of the right camera S1R. The housing of the right camera S1R is basically composed of the base part S11R and the cover S12R. The imaging part S10R, the mounting part S13R, and the harness S16R are partly covered by the cover S12R. The cover S12R prevents entry of rainwater or the like into the housing. Furthermore, the cover S12R controls transfer of heat generated by a heat generating body within the engine hood 50 to the imaging part S10R by radiation and convection. For example, the cover S12R prevents hot air from directly contacting the imaging part S10R. Therefore, it is possible to protect the imaging part S10R from heat generated by a heat generating body within the engine hood 50 and to prevent the imaging part S10R from being degraded by the heat. According to this embodiment, the cover S12R is out of contact with the engine hood 50 that becomes hot. Therefore, it is possible to prevent heat generated by the engine hood 50 from being transferred to the imaging part S10R by thermal conduction. Furthermore, the cover S12R is formed of a heat resistant resin. Therefore, it is possible to further control transfer of heat generated by a heat generating body contained in the engine hood 50 to the imaging part S10R than in the case where the cover S12R is formed of metal. This is because resin is lower in thermal conductivity than metal, that is, resin is less likely to be high in temperature. The cover S12R, however, may also be formed of a material other than resin, such as ceramic or metal. According to the illustration of FIG. 4, the heat generating body includes an exhaust gas treatment apparatus 60. The cover S12R is, for example, screwed, but may alternatively be attached by another method such as joining by a snap-fit or bonding with an adhesive, to the base part S11R.

Examples of the exhaust gas treatment apparatus 60 as a heat generating body include a selective catalytic reduction (SCR) system and a diesel particulate filter (DPF). The exhaust gas treatment apparatus 60, however, may be omitted. In this case, the heat generating body may be, for example, a muffler that has only a sound absorbing function without having a purifying function.

The mounting part S13R is a member for attaching the imaging part S10R to the base part S11R in a desired position. According to this embodiment, the mounting part S13R includes a bracket S13Ra elongated in a Z-axis direction and a holder S13Rb holding the imaging part S10R from both sides, and holds the imaging part S10R aloft over the base part S11R (out of contact with the base part S11R). The holder S13Rb is attached near the upper end (+Z side end) of the bracket S13Ra in order to prevent the imaging part S10R from contacting liquid such as rainwater that has entered the housing. Furthermore, the mounting part S13R holds the imaging part S10R such that the optical axis of the imaging part S10R points obliquely downward, so as to allow the imaging part S10R to image the ground immediately near the right side of the shovel.

The bracket part S14R is a member for attaching the base part S11R to the right house frame 52R. According to this embodiment, the bracket part S14R is formed of metal for high stiffness, but may alternatively be formed of another material such as resin. Furthermore, the bracket part S14R is formed as a member separate from the base part S11R, and is joined to the base part S11R by welding. The bracket part S14R, however, may be joined thereto by another method such as brazing or an adhesive. Alternatively, the bracket part S14R and the base part S11R may be formed as one piece. As yet another alternative, the bracket part S14R may be omitted. In this case, the base part S11R is attached directly to the right house frame 52R, for example.

The bracket part S14R positions the housing of the right camera S1R such that the housing protrudes outward (toward the +X side) from the right cut 50CR of the engine hood 50 and further protrudes outward (toward the +X side) beyond the right end face (for example, a plane surface including the surface of the right side door 51R), in order to allow the imaging part S10R to image the ground immediately near the right side of the shovel. Preferably, the bracket part S14R positions the housing such that the outside (+X side) end of the cover S12R is not outside the maximum transportation width of the shovel, in order that the shovel can be transported with the right camera S1R being attached.

The height of the bracket part S14R is determined such that the left camera S1L, the right camera S1R, and the back camera S1B are equal in height, for example. Therefore, the respective bracket parts of the left camera S1L, the right camera S1R, and the back camera S1B may be different in height from one another.

The fastening member S15R is an example of a fixing part, and is configured to be able to fasten and fix the right camera S1R to the right house frame 52R. Normally, according to the right camera S1R, the imaging part S10R, the base part S11R, the cover S12R, the mounting part S13R, the bracket part S14R, and the harness S16R are supplied, being assembled into a single unit, which is fastened and fixed to the right house frame 52R. According to this embodiment, the fastening member S15R includes externally threaded bolts, and is inserted into threaded holes formed in the bracket part S14R from below. In the case of omitting the bracket part S14R, the fastening member S15R is inserted into threaded holes formed in the base part S11R from below. Specifically, the fastening member S15R is inserted, from below, into threaded holes formed in the bracket part S14R through holes formed in an upper plate member of the right house frame 52R having a U-shaped cross section that is open in the −X direction. The dashed arrow in the drawing represents an access path to the fastening member S15R. That is, the fastening member S15R is so placed as to be accessible from below the right house frame 52R. The space below the right house frame 52R is closed by the right side door 51R that can be locked. Therefore, this fastening method produces the antitheft effect because who intends to loosen the fastening member S15R has to open the right side door 51R to access the fastening member S15R.

The harness S16R is a bundle of electric wires that connects the right camera S1R and an external apparatus. Examples of the external apparatus include a processor that processes images captured by the right camera S1R and a power supply unit that supplies electric power to the right camera S1R. According to this embodiment, as illustrated in FIGS. 4 and 5, the harness S16R is extended using a connector S16Ra and is fastened to the base part S11R using a fastener S16Rb within the cover S12R. Furthermore, the harness S16R extends outside the cover S12R through a hole S12HR formed in the rear end (−X side end) of the cover S12R. The harness S16R may be connected to the external apparatus via one or more connectors outside the cover S12R. Where the hole S12HR is formed is positioned within the engine hood 50 and is not exposed to the outside. Therefore, it is possible to prevent raindrops, dust, etc., from entering the cover S12R, so that it is possible to prevent raindrops, dust, etc., from adversely affecting the imaging part S10R. As a result, it is possible to ensure the visibility of an image displayed on the display device 40.

Figure 6:
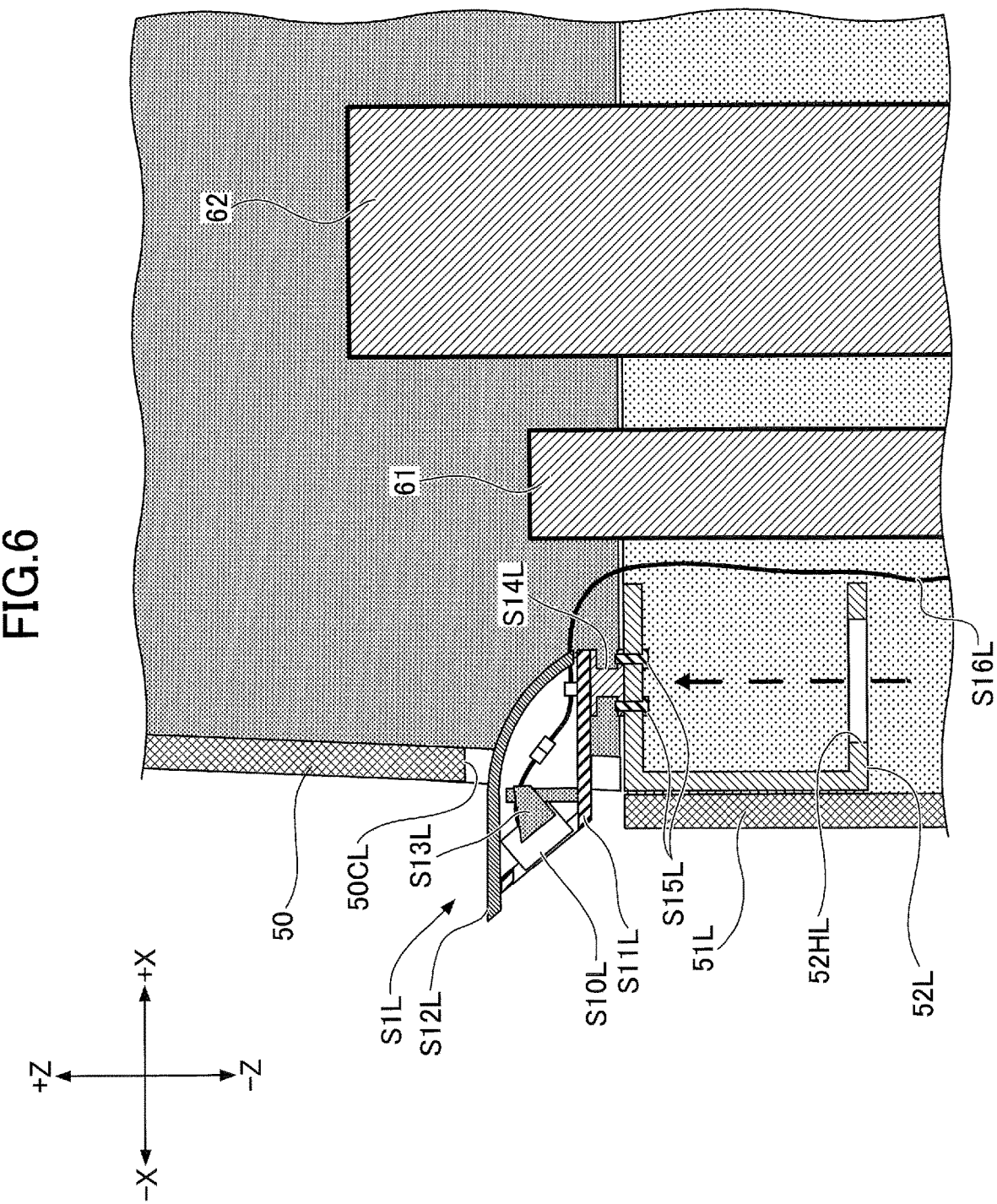
FIG. 6 is a sectional view of a left camera and its vicinity.

Next, the left camera S1L is described in detail with reference to FIG. 6. FIG. 6 illustrates a cross section in a virtual vertical plane indicated by the line VI-VI in FIG. 2. According to the illustration of FIG. 6, the left camera S1L has the same configuration as the right camera S1R. That is, the housing of the left camera S1L is basically composed of a base part S11L and a cover S12L. An imaging part S10L, a mounting part S13L, and a harness S16L are partly covered by the cover S12L.

According to the illustration of FIG. 6, the cover S12L is formed of a heat resistant resin the same as the cover S12R of the right camera S1R. Therefore, it is possible to further control transfer of heat generated by a heat generating body contained in the engine hood 50 to the imaging part S10L than in the case where the cover S12L is formed of metal. That is, it is possible to protect the imaging part S10L from the heat generated by the heat generating body within the engine hood 50. According to the illustration of FIG. 6, the heat generating body includes an oil cooler 61 and a radiator 62.

Furthermore, the same as the fastening member S15R of the right camera S1R, a fastening member S15L includes externally threaded bolts, and is inserted into threaded holes formed in a bracket part S14L from below. Specifically, the fastening member S15L is inserted, from below, into threaded holes formed in the bracket part S14L through holes formed in an upper plate member of the left house frame 52L having a U-shaped cross section that is open in the +X direction. The dashed arrow in the drawing represents an access path to the fastening member S15L. That is, the fastening member S15L is so configured as to be accessible from below the left house frame 52L. The space below the left house frame 52L is closed by the left side door 51L that can be locked. Therefore, this fastening method produces the antitheft effect because who intends to loosen the fastening member S15L has to open the left side door 51L to access the fastening member S15L. Furthermore, According to the illustration of FIG. 6, a hole 52HL is formed in a lower plate portion of the left house frame 52L to facilitate accessing the fastening member S15L. A worker can tighten or loosen the fastening member S15L by inserting a tool into the hole 52HL. The same hole may be formed in a lower plate portion of the right house frame 52R. The hole 52HL may be omitted.

As described above, according to the shovel of this embodiment, the right camera S1R is placed on the upper surface of the upper turning body 3 in such a manner as to be at least partly within the engine hood 50 through the right cut 50CR. Therefore, even when the upper turning body 3 cannot provide a sufficient space for placing the right camera S1R outside the engine hood 50, the right camera S1R can be placed at a desired position. The "desired position" is a position where the right camera S1R can capture an image representing a desired spatial area on the right side of the shovel. The same is the case with the left camera S1L.

Furthermore, the right camera S1R is so placed as to be attachable and detachable with the engine hood 50 being closed. That is, a worker does not have to open the engine hood 50 when replacing the right camera S1R. The same is the case with the left camera S1L.

Furthermore, the engine hood 50 has only to include the relatively small right cut 50CR for placing the right camera S1R, and does not have to include a relatively large opening for the work of attaching or detaching the right camera S1R.

The same is the case with the left camera S1L. Therefore, the appearance of the engine hood 50 is not impaired, either.

Figure 7:
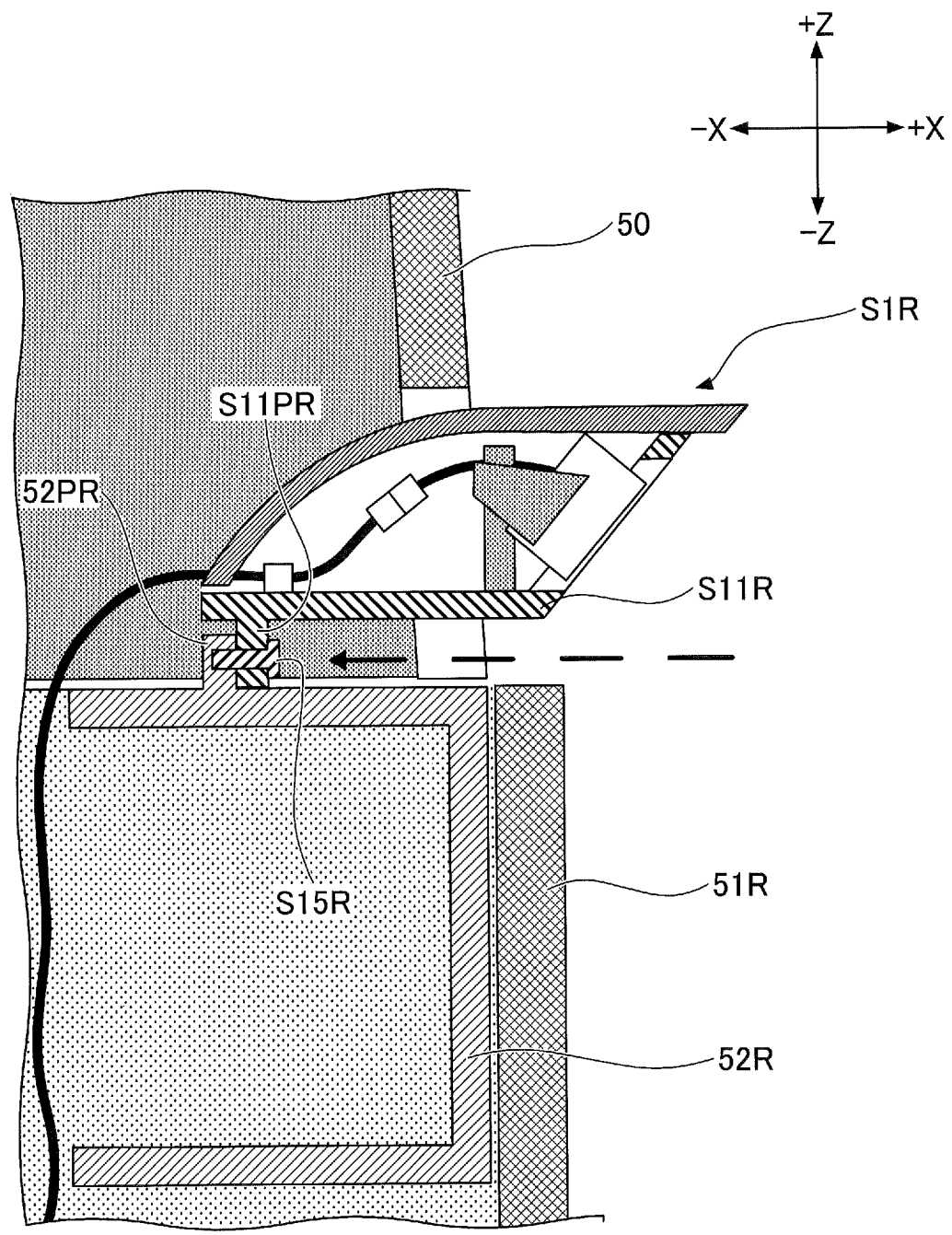
FIG. 7 is a sectional view of the right camera and its vicinity.

Next, another attachment structure of the camera S1 is described with reference to FIG. 7. FIG. 7 is a sectional view of the right camera S1R, corresponding to FIG. 4. The attachment structure of FIG. 7 is different from the attachment structure of FIG. 4, according to which the fastening member S15R is so placed as to be accessed from below the right house frame 52R, in that the fastening member S15R is so placed as to be accessed from the side (+X side).

Specifically, the base part S11R of the right camera S1R includes a protrusion S11PR protruding downward) (in the −Z direction), and the right house frame 52R includes a protrusion 52PR protruding upward (in the +Z direction). An externally threaded screw serving as the fastening member S15R is inserted through a hole formed in the protrusion S11PR from the right side (+X side) and inserted into a threaded hole formed in the protrusion 52PR from the right side (+X side). The positions of the protrusion S11PR and the protrusion 52PR may be laterally reversed. In this case, the externally threaded screw serving as the fastening member S15R is inserted through a hole formed in the protrusion 52PR from the right side (+X side) and is inserted into a threaded hole formed in the protrusion S11PR from the right side (+X side). The protrusion S11PR may be formed as a member separate from the base part S11R. In this case, the protrusion S11PR may be joined to the base part S11R by an arbitrary method such as joining by welding or joining with an adhesive.

According to this configuration, the shovel to which the right camera S1R is attached as illustrated in FIG. 7 can achieve the same effects as the shovel to which the right camera S1R is attached as illustrated in FIG. 4. Furthermore, according to the configuration of FIG. 7, the right camera S1R can be attached and detached independent of the opening and closing of the right side door 51R.

Figure 8:
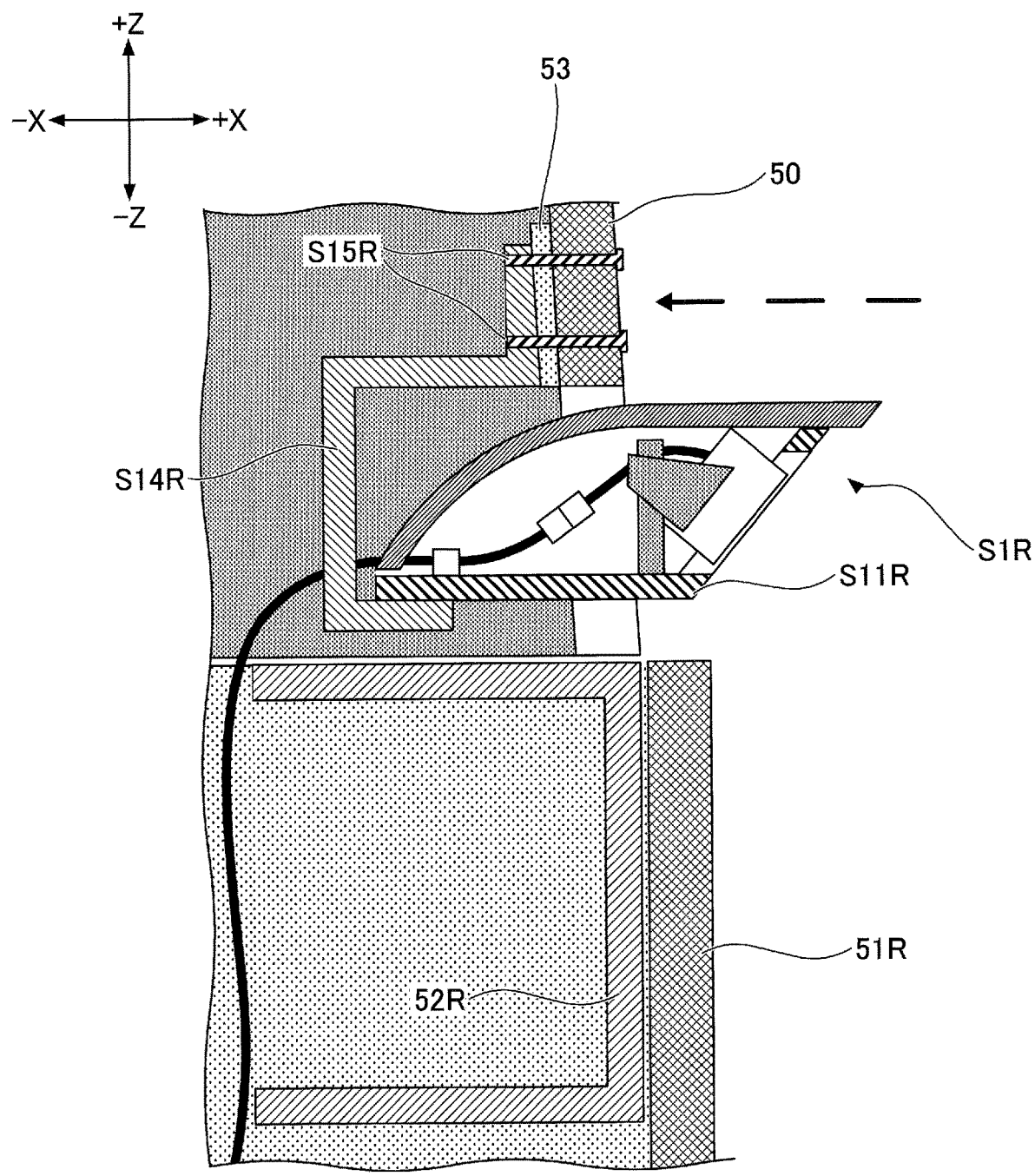
FIG. 8 is a sectional view of the right camera and its vicinity.

Next, yet another attachment structure of the camera S1 is described with reference to FIG. 8. FIG. 8 is a sectional view of the right camera S1R, corresponding to FIGS. 4 and 7. The attachment structure of FIG. 8 is different from the attachment structure of FIG. 4, according to which the fastening member S15R is so placed as to be accessed from below the right house frame 52R, in that the fastening member S15R is so placed as to be accessed from the side (+X side). Furthermore, the attachment structure of FIG. 8 is different from the attachment structures of FIGS. 4 and 7, according to which the base part S11R is attached to the right house frame 52R via the bracket part S14R or the protrusions S11PR and 52PR, in that the base part S11R is attached to the engine hood 50 via the bracket part S14R.

Specifically, the bracket part S14R of the right camera S1R of FIG. 8 is attached to the engine hood 50 via a thermal insulator 53 formed of ceramic, rubber or the like, in order to prevent the bracket part S14R, the base part S11R, and further the imaging part S10R from being overheated through thermal conduction from the hot engine hood 50.

The thermal insulator 53 may have a cushioning property (buffering property) in order to prevent vibrations or the like of the upper turning body 3 from being transmitted to the right camera S1R. The thermal insulator 53 may be employed in the configurations of FIGS. 4, 6 and 7.

Externally threaded bolts serving as the fastening member S15R are inserted through holes formed in each of the engine hood 50 and the thermal insulator 53 from the right side (+X side) and are inserted into threaded holes formed in the bracket part S14R from the right side (+X side).

According to this configuration, the shovel to which the right camera S1R is attached as illustrated in FIG. 8 can achieve the same effects as the shovel to which the right camera S1R is attached as illustrated in each of FIGS. 4 and 7. Furthermore, according to the configuration of FIG. 8, the right camera S1R can be attached and detached independent of the opening and closing of the right side door 51R, the same as in the configuration of FIG. 7.

Figure 9:
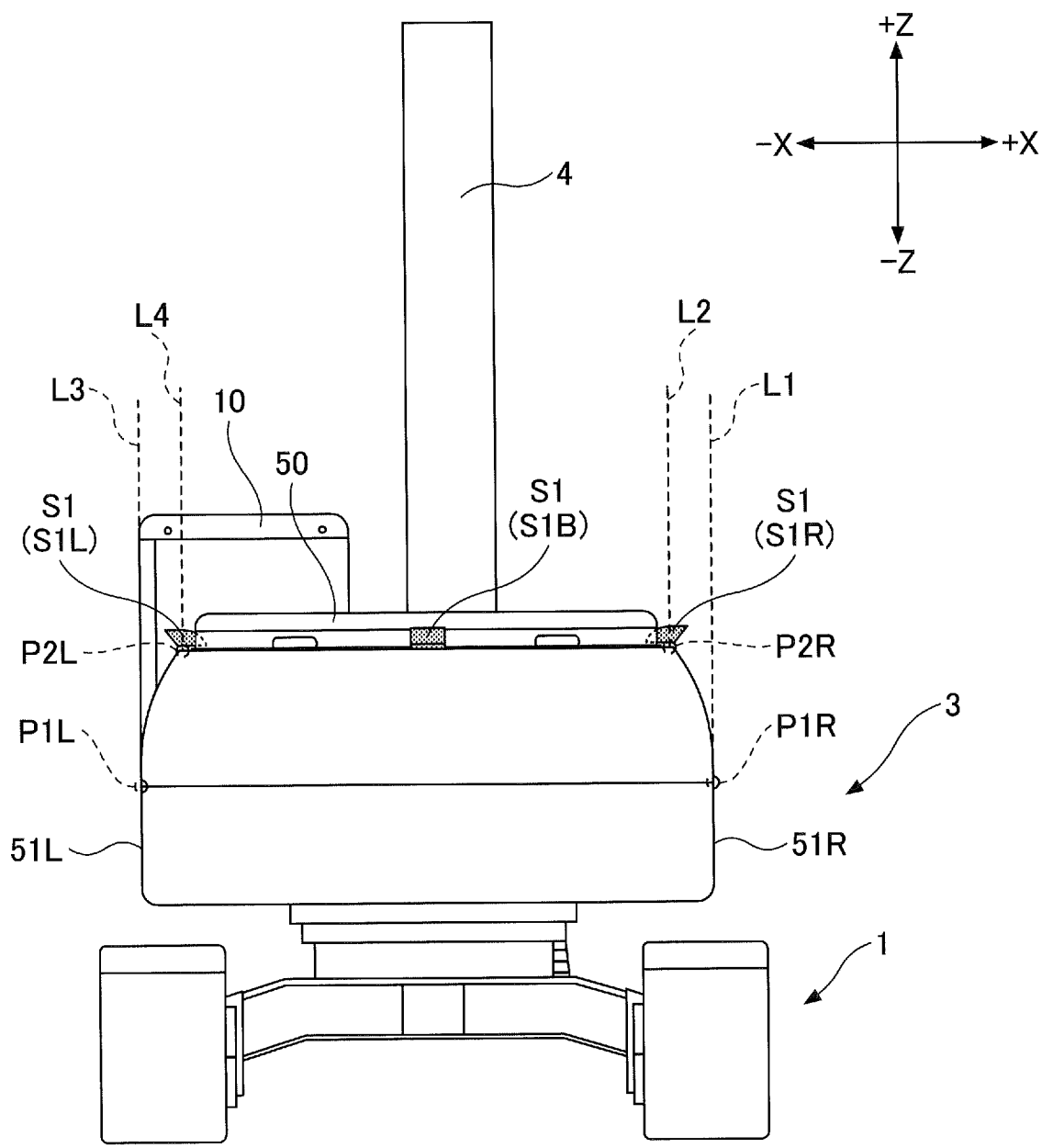
FIG. 9 is a rear view of the shovel.
Figure 10:
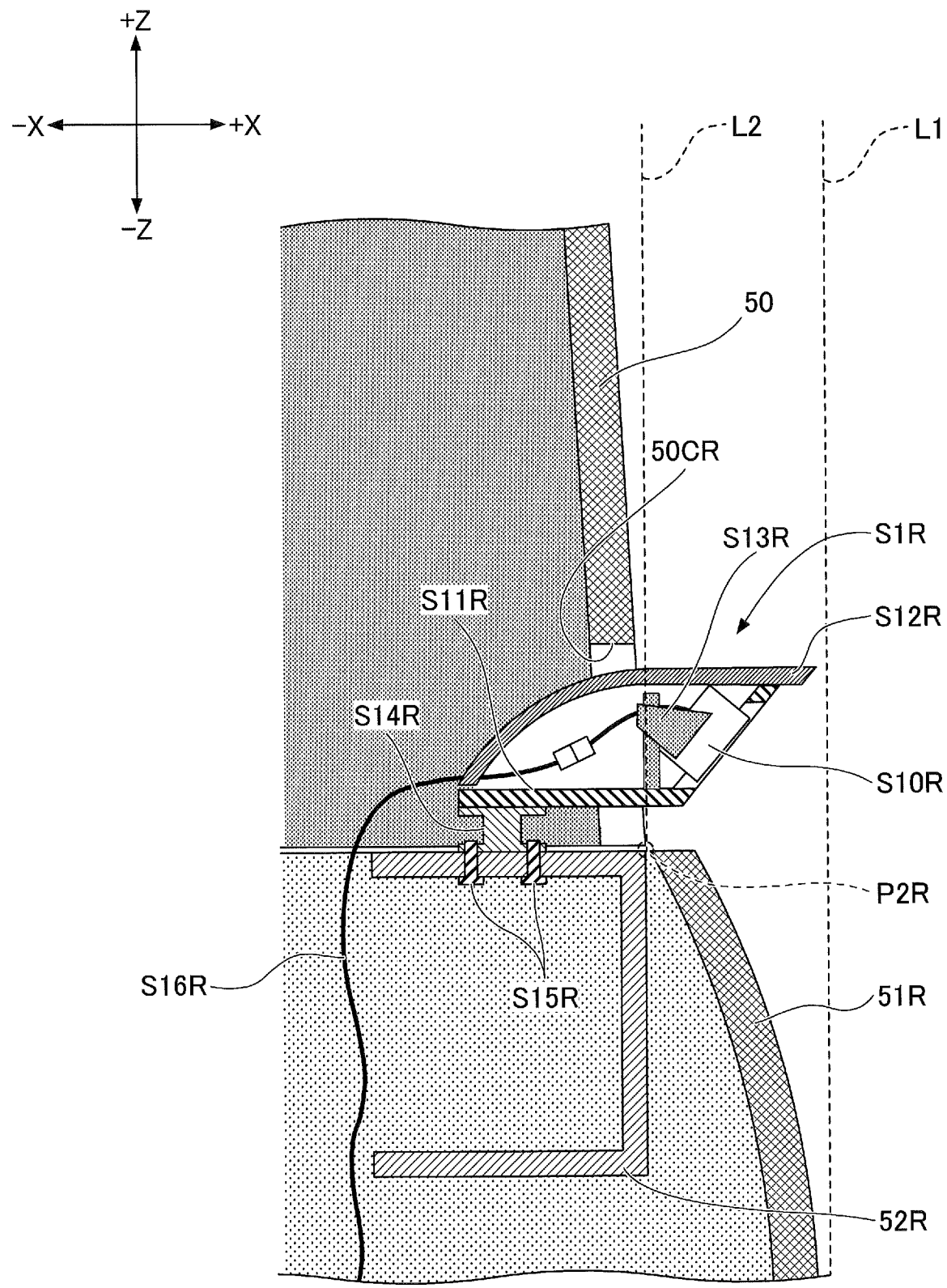
FIG. 10 is a sectional view of the right camera and its vicinity.

Next, another arrangement of the camera S1 is described with reference to FIGS. 9 and 10. FIG. 9 is a rear view of a shovel according to another embodiment of the present invention. FIG. 10 is a sectional view of the right camera S1R attached to the shovel of FIG. 9 and its vicinity, corresponding to FIG. 4. The left camera S1L and the right camera S1R illustrated in FIG. 9 are different in being so arranged as not to protrude further than the most protruding portion of the upper turning body 3 from, but otherwise equal to, the configuration illustrated in FIG. 1. Therefore, a description of the common portion is omitted, and differences are described in detail.

According to the illustration of FIG. 9, each of the left side door 51L and the right side door 51R is so curved as to bulge outward. Therefore, a most protruding portion P1L of the left side door 51L is positioned on the left side (−X side) of a left end P2L of the upper surface of the upper turning body 3 to be the left side (−X side) most protruding portion P1L of the upper turning body 3. Furthermore, a most protruding portion P1R of the right side door 51R is positioned on the right side (+X side) of a right end P2R of the upper surface of the upper turning body 3 to be the right side (+X side) most protruding portion P1R of the upper turning body 3.

As illustrated in FIGS. 9 and 10, the right camera S1R is so placed as not to protrude to the right side (+X side) of the right side (+X side) most protruding portion P1R of the upper turning body 3 and as to protrude to the right side (+X side) of the right end P2R of the upper surface of the upper turning body 3. Specifically, the right end (+X side end) of the right camera S1R is positioned between a YZ plane including a line segment L1 passing through the right side most protruding portion P1R and a YZ plane including a line segment L2 passing through the right end P2R of the upper surface of the upper turning body 3.

As illustrated in FIG. 9, the left camera S1L is so placed as not to protrude to the left side (−X side) of the left side (−X side) most protruding portion P1L of the upper turning body 3 and as to protrude to the left side (−X side) of the left end P2L of the upper surface of the upper turning body 3. Specifically, the left end (−X side end) of the left camera S1L is positioned between a YZ plane including a line segment L3 passing through the left side most protruding portion P1L and a YZ plane including a line segment L4 passing through the left end P2L of the upper surface of the upper turning body 3.

According to this configuration, the shovel can be transported with the left camera S1L and the right camera S1R being attached to the upper turning body 3 because it is ensured that the width of the shovel including the left camera S1L and the right camera S1R is smaller than the maximum transportation width of the shovel.

Figure 11:
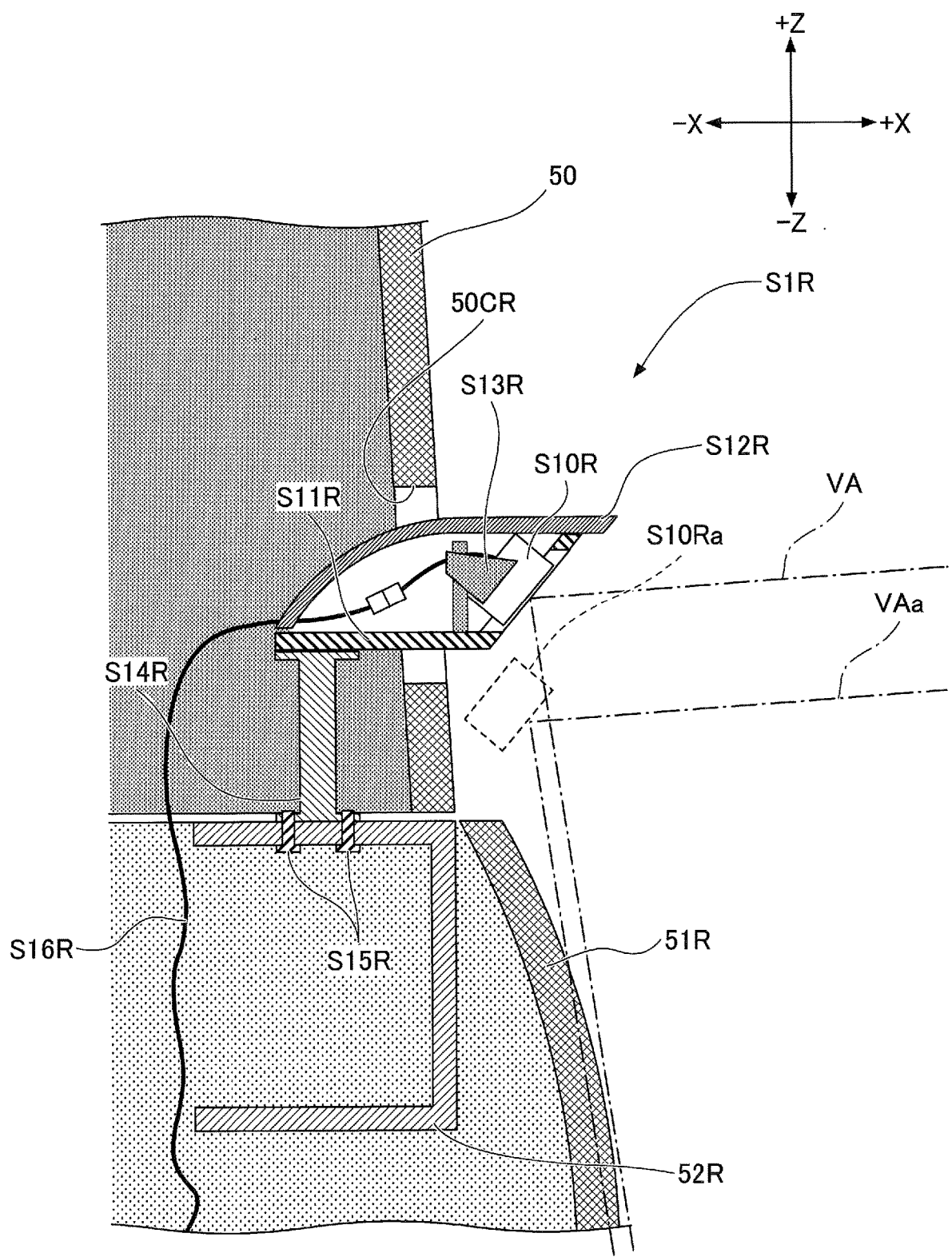
FIG. 11 is a sectional view of the right camera and its vicinity.

Next, another attachment structure of the camera S1 attached to the shovel illustrated in FIGS. 9 and 10 is described with reference to FIG. 11. FIG. 11 is a sectional view of the right camera S1R, corresponding to FIG. 10. The attachment structure of FIG. 11 is different in that the right camera S1R is fixed at a higher position from, but otherwise equal to, the attachment structure of FIG. 10. Therefore, a description of the common portion is omitted, and differences are described in detail.

In the illustration of FIG. 11, the right cut 50CR of the engine hood 50 is formed at a higher position than in the case of FIG. 10. Therefore, the bracket part S14R of FIG. 11 is configured to be longer in a Z-axis direction than the bracket part S14R of FIG. 10. The right cut 50CR, which is formed as an independent rectangular hole positioned away from the lower end of the engine hood 50 in the illustration of FIG. 11, may alternatively be formed as a cut extending from the lower end of the engine hood 50 the same as in the case of FIG. 10 in order to facilitate opening and closing or attachment and detachment of the engine hood 50 with the right camera S1R being attached.

According to this configuration, it is possible to prevent the right camera S1R from imaging part of the right side door 51R. Specifically, an imaging part S10Ra indicated by the dashed line in FIG. 11 indicates the height of the imaging part S10R of the right camera S1R in FIG. 10. Furthermore, the one-dot chain lines extending from the imaging part S10Ra indicate an imaging range VAa of the imaging part S10Ra. As illustrated in FIG. 11, the imaging range VAa includes part of the right side door 51R. In contrast, the imaging part S10R of the right camera S1R in FIG. 11 has an imaging range VA indicated by one-dot chain lines, and the imaging range VA does not include part of the right side door 51R. That is the right camera S1R does not image the right side door 51R. Therefore, the right camera S1R in FIG. 11 can secure a wider field of view in a space near the shovel than in the case of FIG. 10.

Figure 12A:
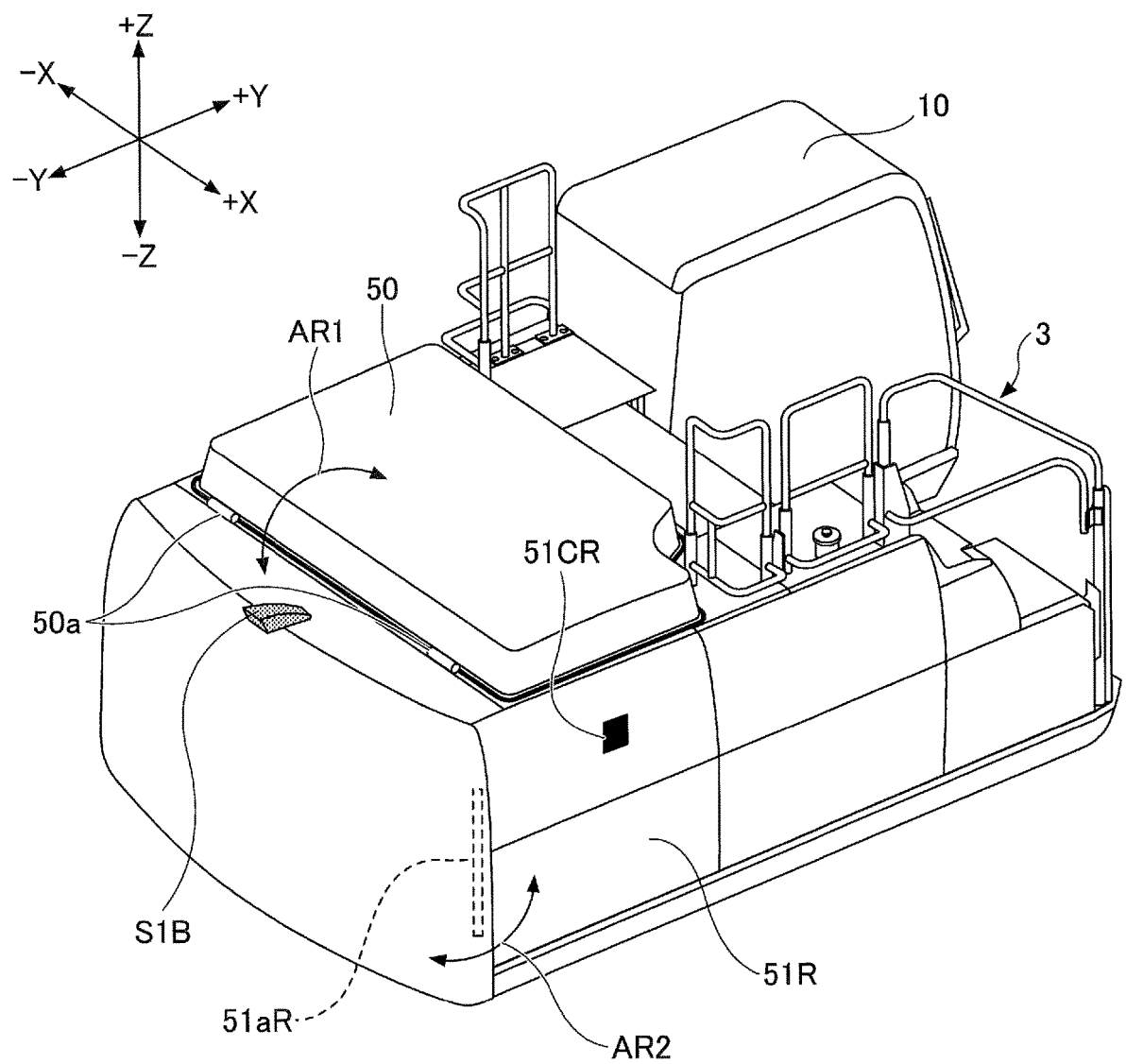
FIG. 12A is a rear perspective view of the upper turning body.
Figure 12B:
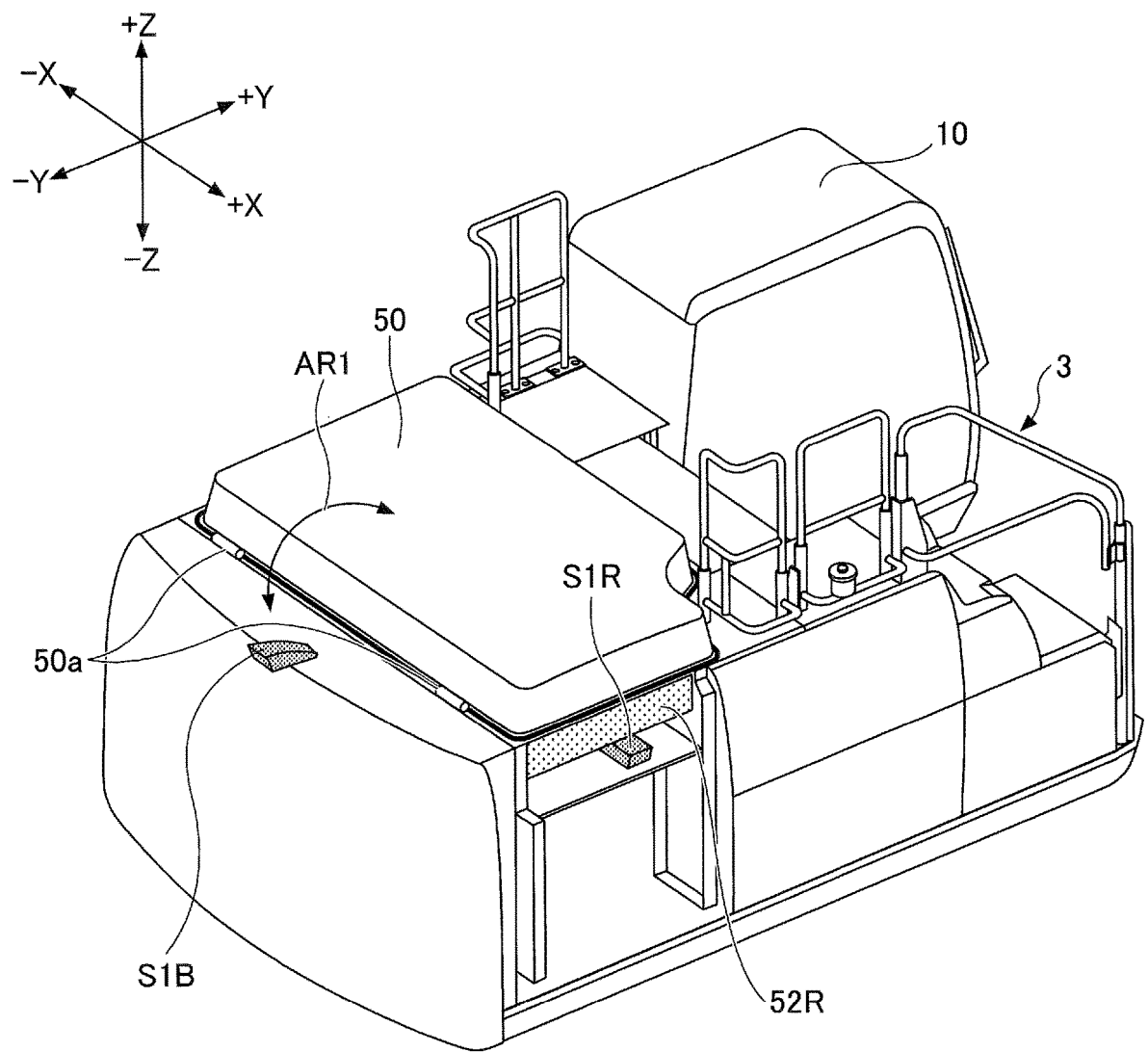
FIG. 12B is a rear perspective view of the upper turning body.

Next, yet another arrangement of the camera S1 is described with reference to FIGS. 12A and 12B. FIGS. 12A and 12B are rear perspective views of the upper turning body 3. FIG. 12A illustrates that the right camera S1R is removed while the right side door 51R is attached. FIG. 12B illustrates that the right camera S1R is attached while the right side door 51R is removed.

According to the illustration of FIGS. 12A and 12B, the right camera S1R is placed at the right side surface of the upper turning body 3 in such a manner as to be partly inside the right side door 51R, serving as a covering for the right camera S1R, through a right cut 51CR formed in the right side door 51R. More specifically, the right camera S1R is removably attached to the right house frame 52R exposed by opening the right side door 51R.

Although invisible in FIGS. 12A and 12B, the left camera S1L is likewise placed at the left side surface of the upper turning body 3 in such a manner as to be partly inside the left side door 51L, serving as a covering for the left camera S1L, through a left cut formed in the left side door 51L. More specifically, the left camera S1L is removably attached to the left house frame 52L (see FIG. 6) exposed by opening the left side door 51L.

As indicated by the arrow AR2 of FIG. 12A, the right side door 51R is configured to be openable and closable on a hinge 51aR serving as a rotating shaft. When the right side door 51R is opened, the entirety of the right camera S1R attached to the right house frame 52R is exposed as illustrated in FIG. 12B. Furthermore, the right side door 51R is configured to be lockable. The same applies to the left side door 51L serving as a covering for the left camera S1L. According to this configuration, the shovel can prevent the theft of the left camera S1L and the right camera S1R.

Figure 13:
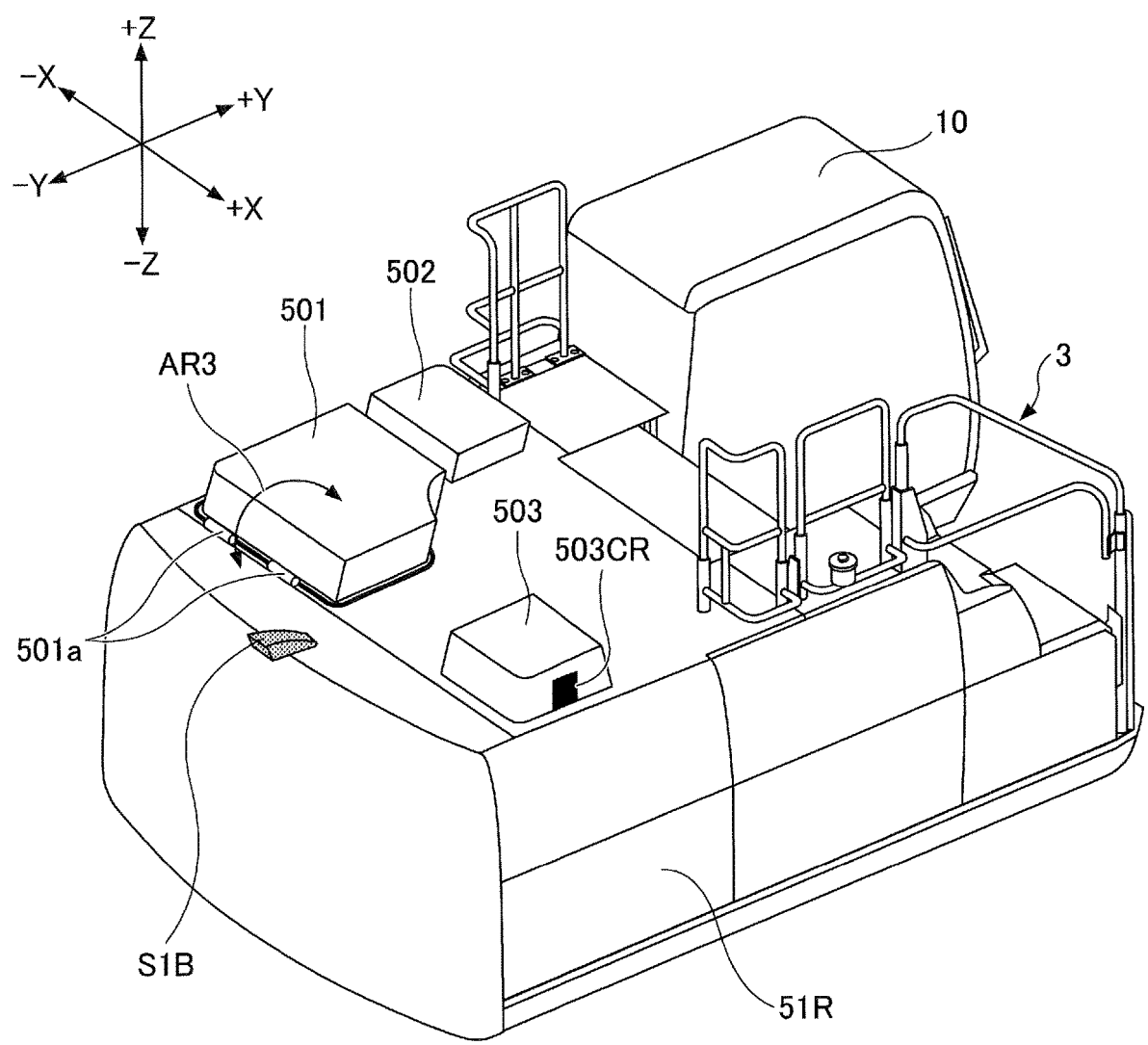
FIG. 13 is a rear perspective view of the upper turning body.

Next, still another arrangement of the camera S1 is described with reference to FIG. 13. FIG. 13 is a rear perspective view of the upper turning body 3. FIG. 13 illustrates that the right camera S1R is removed.

According to the illustration of FIG. 13, an engine hood 501, an air filter cover 502, and a pump cover 503 are disposed in combination on the upper surface of the upper turning body 3 in place of the engine hood 50. Like the engine hood 50, the engine hood 501 is a covering over a space in which the engine is installed. The air filter cover 502 is a covering over a space in which an air filter is installed. The pump cover 503 is a covering over a space in which a hydraulic pump is installed. Like the engine hood 50, the engine hood 501 is configured to be openable and closable on hinges 501a serving as a rotating shaft as indicated by the arrow AR3. In contrast, the air filter cover 502 and the pump cover 503 are configured to be removable and not openable or closable, and specifically, are fastened to the upper turning body 3 with bolts.

The right camera S1R is placed on the upper surface of the upper turning body 3 in such a manner as to be partly within the pump cover 503 through a right cut 503CR famed in a lateral side of the pump cover 503 serving as a covering for the right camera S1R. When the pump cover 503 is removed, the entirety of the right camera S1R attached to the right house frame 52R is exposed.

Likewise, the left camera S1L is placed on the upper surface of the upper turning body 3 in such a manner as to be partly within the air filter cover 502 through a left cut (invisible in FIG. 13) formed in a lateral side of the air filter cover 502 serving as a covering for the left camera S1L. When the air filter cover 502 is removed, the entirety of the left camera S1L attached to the left house frame 52L is exposed.

Thus, the camera S1 may be so placed as to be partly within not only a covering over the entire width of the upper turning body 3, such as the engine hood 50, but also a relatively small covering such as the air filter cover 502 or the pump cover 503.

Figure 14:
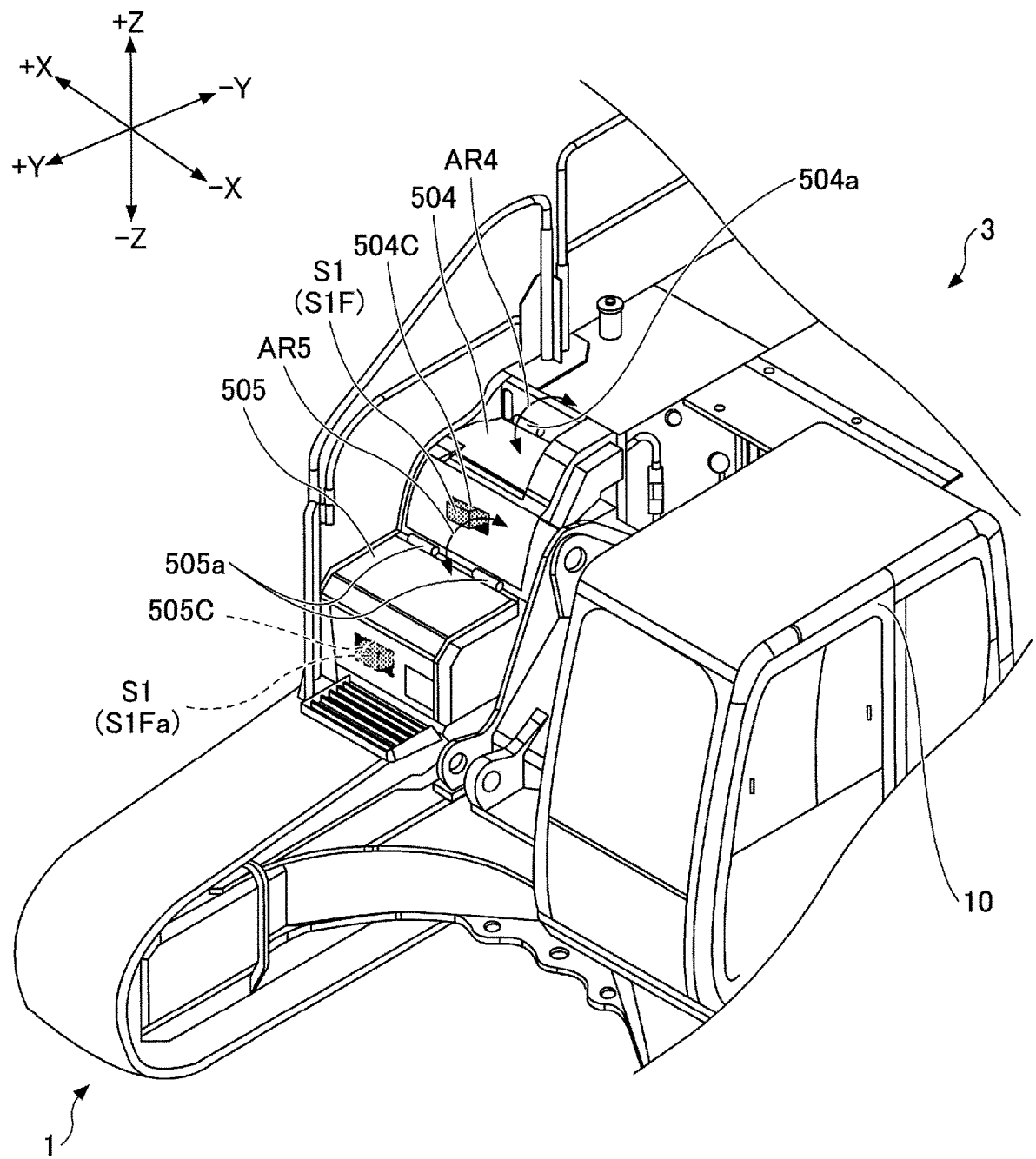
FIG. 14 is a front perspective view of the shovel.

Next, still another arrangement of the camera S1 is described with reference to FIG. 14. FIG. 14 is a front perspective view of the shovel.

According to the illustration of FIG. 14, the camera S1 includes a front camera S1F. The front camera S1F is so placed as to be partly within an aqueous urea solution tank cover 504 serving as a covering for the front camera S1F through a cut 504C formed in a front side (+Y side) of the aqueous urea solution tank cover 504. The aqueous urea solution tank cover 504 is a covering that covers an aqueous urea solution tank, and forms part of the outer wall of the upper turning body 3. The top side of the aqueous urea solution tank cover 504 is so configured as to be openable and closable on a hinge 504a serving as a rotating shaft as indicated by the arrow AR4 in FIG. 14. When the top side of the aqueous urea solution tank cover 504 is opened, the entirety of the front camera S1F is exposed.

The front camera S1F may alternatively be so placed as to be partly within a tool box cover 505. The tool box cover 505 is a covering that covers a space for accommodating tools, and forms part of the outer wall of the upper turning body 3. Specifically, a virtual front camera S1Fa indicated by the dashed line in FIG. 14 illustrates the front camera S1F so placed as to be partly within the tool box cover 505. Furthermore, a virtual cut 505C indicated by the dashed line in FIG. 14 illustrates a cut so formed in the front side (+Y side) of the tool box cover 505 as to receive the front camera S1Fa. In this case, the front camera S1Fa is so placed as to be partly within the tool box cover 505 through the cut 505C. The top side of the tool box cover 505 is configured to be openable and closable on hinges 505a serving as a rotating shaft as indicated by the arrow AR5 in FIG. 14. When the top side of the tool box cover 505 is opened, the entirety of the front camera S1Fa is exposed.

Thus, the camera S1 may be so placed as to be partly within not only a covering installed on the rear portion of the upper turning body 3, such as the engine hood 50, but also a covering installed on the front portion of the upper turning body 3, such as the aqueous urea solution tank cover 504 or the tool box cover 505.

Figure 15:
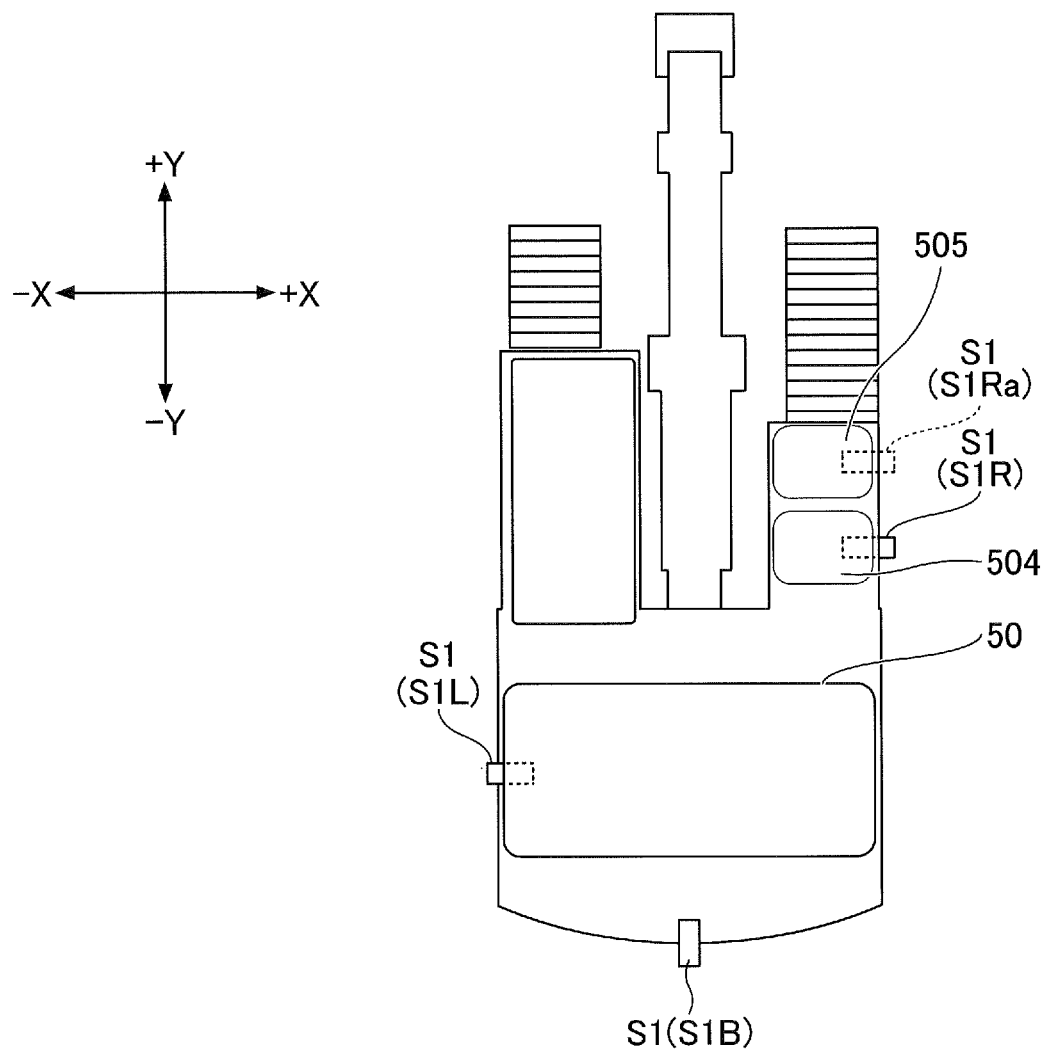
FIG. 15 is a plan view of the shovel.

Next, still another arrangement of the camera S1 is described with reference to FIG. 15. FIG. 15 is a plan view of the shovel.

According to the illustration of FIG. 15, the right camera S1R is so placed as to be partly within the aqueous urea solution tank cover 504 serving as a covering for the right camera S1R through a cut formed in the right side (+X side) of the aqueous urea solution tank cover 504. The top side of the aqueous urea solution tank cover 504 is so configured as to be openable and closable on the hinge 504a serving as a rotating shaft as indicated by the arrow AR4 in FIG. 14. When the top side of the aqueous urea solution tank cover 504 is opened, the entirety of the right camera S1R is exposed.

The right camera S1R may also be so placed as to be partly within the tool box cover 505 through the right side of the tool box cover 505. Specifically, a virtual right camera S1Ra indicated by the dashed line in FIG. 15 illustrates the right camera S1R so placed as to be partly within the tool box cover 505. In this case, the right camera S1R is so placed as to be partly within the tool box cover 505 through a cut formed in the right side of the tool box cover 505. The top side of the tool box cover 505 is so configured as to be openable and closable on the hinges 505a serving as a rotating shaft as indicated by the arrow AR5 in FIG. 14. When the top side of the tool box cover 505 is opened, the entirety of the right camera S1Ra is exposed.

Thus, the camera S1 may be so placed as to be partly within a covering installed on the front portion of the upper turning body 3, such as the aqueous urea solution tank cover 504 or the tool box cover 505, through a cut formed in not only the front side (+Y side) but also a lateral side of the covering.

As described above, the shovel according to an embodiment of the present invention includes the lower traveling body 1, the upper turning body 3 turnably mounted on the lower traveling body 1, a covering attached on the upper turning body 3, and the surroundings monitoring camera S1 placed on the upper turning body 3. A cut is formed in the covering. The camera S1 is placed on the upper turning body 3 such that at least part of the camera S1 is within the covering through the cut. This configuration makes it possible for the shovel according to the embodiment of the present invention to allow the camera S1 to be placed at a desired position even when the upper turning body 3 cannot provide a sufficient space for placing the camera S1.

The camera S1 may be covered with a resin cover. The cover may be so placed as to be within the covering through the cut. According to this configuration, the camera S1 can prevent heat generated by a heat generating body accommodated in the covering from being transferred to the inside of the cover.

The covering according to an embodiment of the present invention is configured to be attachable and detachable or openable and closable relative to, for example, the upper turning body 3. Specifically, the covering is the engine hood 50, the engine hood 501, the air filter cover 502, the pump cover 503, the aqueous urea solution tank cover 504, the tool box cover 505, the left side door 51L, or the right side door 51R. The covering forms part of the outer wall of the upper turning body 3, and is so configured as to make the inside of the upper turning body 3 visible when detached or opened and to separate the inside and the outside of the upper turning body 3 when attached or closed. According to this configuration, the shovel can prevent the theft of the camera S1 at low cost. This is because it is possible to prevent the theft of the camera S1 using the covering having the original function different from the function of preventing the theft of the camera S1, that is, it is possible to prevent the theft of the camera S1 without using a dedicated cover or the like for preventing the theft of the camera S1. The original function of the engine hood 50, which is an example of the covering, includes, for example, separating a space in which the engine is installed from the external space.

Examples of the camera S1 include the back camera S1B, the left camera S1L, and the right camera S1R. The right camera S1R may be, for example, attached to the upper turning body 3 via the bracket part S14R. Furthermore, the right camera S1R may be so placed on the upper turning body 3 as to be attachable and detachable with the engine hood 50 being closed. This configuration enables a worker to attach the right camera S1R to the upper turning body 3 or detach the right camera S1R from the upper turning body 3 without opening the engine hood 50.

The camera S1 may be fixed to a house frame with a fixing part, for example. The fixing part may be so placed as to be accessible from below or the side of the house frame. The house frame is part of the framework of the upper turning body 3, and may be either a longitudinal member or a cross member. The fixing part may be composed of fastening members such as bolts, nuts, and screws or may be composed of another known structure such as a snap-fit structure. Specifically, the right camera S1R may be fastened to the right house frame 52R with the fastening member S15R. The fastening member S15R may be so placed as to be accessible from below or the side of the right house frame 52R. Alternatively, the camera S1 may be attached to the engine hood 50, the engine hood 501, the air filter cover 502, the pump cover 503 or the like via the thermal insulator 53, for example.

The covering according to an embodiment of the present invention may be configured to have a top side and a lateral side. The camera S1 may be so placed as to be within the covering through the lateral side of the covering. The top side of the covering is a concept including the upper wall, top plate, etc., of the covering, and the lateral side of the covering is a concept including the sidewall, side plate, etc., of the covering.

The camera S1 may be so configured as not to protrude further than the most protruding lateral portion of the upper turning body 3. Specifically, as illustrated in FIGS. 9 and 10, the camera S1 may be so configured as to protrude to the outer side of neither the left side (−X side) most protruding portion P1L nor the right side (+X side) most protruding portion P1R of the upper turning body 3. According to this configuration, the shovel can be transported with the camera S1 being attached to the upper turning body 3 because it is ensured that the width of the shovel including the camera S1 is smaller than its maximum transportation width.

The covering of the shovel according to an embodiment of the present invention is, for example, the engine hood 50. In this case, the cut may be formed in a lateral side of the engine hood 50. Specifically, as illustrated in FIG. 3B, the right cut 50CR for the right camera S1R may be formed in the right side of the engine hood 50.

The covering of the shovel according to an embodiment of the present invention may be the aqueous urea solution tank cover 504. In this case, the cut may be formed in the front side or the right side of the aqueous urea solution tank cover 504 as illustrated in FIG. 14 or 15. Likewise, the covering of the shovel according to an embodiment of the present invention may be the tool box cover 505. In this case, the cut may be formed in the front side or the right side of the tool box cover 505 as illustrated in FIG. 14 or 15.

The camera S1 may be so placed as to be able to image part of the upper turning body 3. Specifically, the left camera S1L may be so placed as to be able to image part of the left side door 51L, and the right camera S1R may be so placed as to be able to image part of the right side door 51R. Furthermore, the back camera S1B may be so placed as to be able to image part of the upper surface of the upper turning body 3 (counterweight). This is for enabling an operator who looks at an image captured by the camera S1 to intuitively understand the distance between the shovel and an object around the shovel.

The covering of the shovel according to an embodiment of the present invention may include a covering attached to a lateral side of the upper turning body 3, and may be specifically the left side door 51L, the right side door 51R, or the like.

The camera S1 may be so configured as to be attached and detached with a covering different from the covering that covers at least part of the camera S1 being removed or open. Specifically, the right camera S1R may be so configured as to be attached and detached with the right side door 51R, which is a covering different from the engine hood 50 that covers part of the right camera S1R, being open. According to this configuration, the shovel can more reliably prevent the theft of the right camera S1R because it is necessary to unlock the right side door 51R to remove the right camera S1R from the upper turning body 3.

The camera S1 may be so configured as to be attached and detached with the covering that covers at least part of the camera S1 being attached or closed. Specifically, the right camera S1R may be so configured as to be attached and detached with the engine hood 50 covering part of the right camera S1R being closed. This configuration enables a worker to attach and detach the camera S1 easily and quickly.

Embodiments of the present invention are described in detail above. The present invention, however, is not limited to the above-described embodiments. Therefore, variations and modifications may be made to the above-described embodiments without departing from the scope of the present invention.

For example, according to the above-described embodiments, the single right camera S1R is placed at the right cut 50CR of the engine hood 50. The present invention, however, is not limited to this configuration. For example, two cameras may be placed at the right cut 50CR. Alternatively, two right cuts may be formed in the right side (+X side) of the engine hood 50, and one or more cameras may be placed at each right cut. The same is the case with coverings other than the engine hood 50.

Furthermore, according to the above-described embodiments, the back camera S1B is placed outside the engine hood 50. Like the left camera S1L and the right camera S1R, however, the back camera S1B may be so placed as to be at least partly within the engine hood 50.

The invention claimed is:

1. A shovel comprising:
    a lower traveling body;
    an upper turning body turnably mounted on the lower traveling body;
    a covering attached on the upper turning body; and
    a camera for surroundings monitoring, the camera being placed on the upper turning body and not being placed on the covering,
    wherein a cut is formed in the covering, and
    the camera is placed on the upper turning body such that at least part of the camera is within the covering through the cut and part of the camera is exposed outside the covering through the cut.

2. The shovel as claimed in claim 1, wherein
    the camera is covered with a cover formed of resin, and
    the cover is placed within the covering through the cut.

3. The shovel as claimed in claim 1, wherein the camera is attached to the upper turning body via a bracket part.

4. The shovel as claimed in claim 1, wherein the camera is so placed on the upper turning body as to be attachable and detachable with the covering being closed.

5. The shovel as claimed in claim 4, wherein
    the camera is fixed to a house frame with a fixing part, and
    the fixing part is so placed as to be accessible from below or a side of the house frame.

6. The shovel as claimed in claim 1, wherein the covering is an engine hood, a cover, or a door that is attachable and detachable or openable and closable relative to the upper turning body, the covering making an inside of the upper turning body visible when detached or opened, the covering separating the inside and an outside of the upper turning body when attached or closed.

7. The shovel as claimed in claim 1, wherein
    the covering includes a top side and a lateral side, and
    the camera is so placed as to be within the covering through the lateral side of the covering.

8. The shovel as claimed in claim 1, wherein the camera is so configured as not to protrude further than a most protruding lateral portion of the upper turning body.

9. The shovel as claimed in claim 1, wherein
    the covering is an engine hood, and
    the cut is formed in a lateral side of the engine hood.

10. The shovel as claimed in claim 1, wherein
    the covering is a cover of an aqueous urea solution tank or a tool box, and
    the cut is formed in a lateral side of the cover.

11. The shovel as claimed in claim 1, wherein the camera is so placed as to be able to image part of the upper turning body.

12. The shovel as claimed in claim 1, wherein the covering includes a covering attached to a lateral side of the upper turning body.

13. The shovel as claimed in claim 1, wherein the camera is so configured as to be attached and detached with a covering different from the covering that covers the at least part of the camera being removed or open.

14. The shovel as claimed in claim 1, wherein the camera is so configured as to be attached and detached with the covering that covers the at least part of the camera being attached or closed.

* * * * *